Nov. 17, 1970    H. P. KIRCHNER    3,540,915
METHOD OF STRENGTHENING ALUMINA AND SPINEL BODIES
AND STRENGTHENED ALUMINA AND SPINEL
BODIES PRODUCED THEREBY

Filed Dec. 20, 1965    5 Sheets-Sheet 1

INVENTOR
HENRY P. KIRCHNER

BY Wenderoth, Lind & Ponack

ATTORNEYS

Fig. 3

TABLE I

Chemical Strengthening of Fluorinated Alumina

Flexural Strengths - psi.

| Group No. | Controls As cut Refired to 1650°C for one hour | As cut Packed in $Cr_2O_3$ Refired to 1650°C for one hour | Controls Fluorinated Surface Refired to 1650°C for one hour | Fluorinated Surface Packed in $Cr_2O_3$ Refired to 1650°C for one hour | Controls Completely Fluorinated Refired to 1650°C for one hour | Completely Fluorinated Packed in $Cr_2O_3$ Refired to 1650°C for one hour |
|---|---|---|---|---|---|---|
| 1 | 26,754 | 27,590 | 28,016 | 32,230 | 25,972 | 26,760 |
| 2 | 27,030 | 27,790 | 28,776 | 37,920 | 26,905 | 26,885 |
| 3 | 28,050 | 28,391 | 28,488 | 38,014 | 27,126 | 30,997 |
| 4 | 29,393 | 29,353 | 31,315 | 38,306 | 27,177 | 31,771 |
| 5 | 29,910 | 29,619 | 31,969 | 38,808 | 27,478 | 33,267 |
| 6 | 30,494 | 29,655 | 32,048 | 39,402 | 29,327 | 33,306 |
| 7 | 31,858 | 30,600 | 32,931 | 40,845 | 29,330 | 33,324 |
| 8 | 33,950 | 36,860 | 32,938 | 41,024 | 29,451 | 33,531 |
| 9 | 34,396 | 37,097 | 33,000 | 41,406 | 29,731 | 33,606 |
| 10 | --- | 38,929 | 33,254 | 41,613 | --- | 34,375 |

Inventor
HENRY P. KIRCHNER
By Wenderoth, Lind and Ponack
Attorneys

Nov. 17, 1970  H. P. KIRCHNER  3,540,915
METHOD OF STRENGTHENING ALUMINA AND SPINEL BODIES
AND STRENGTHENED ALUMINA AND SPINEL
BODIES PRODUCED THEREBY

Filed Dec. 20, 1965  5 Sheets-Sheet 3

Fig. 4

TABLE II

Chemical Strengthening of Fluorinated Spinel

Degussit SP-23, Hollow Cylinders

| Group No. | Treatment | No. of Pieces | Firing Temp. | Firing Time (hrs.) | Average Flexural Strength |
|---|---|---|---|---|---|
| 11 | Surface fluorinated | 5 | 1400°C | 2 | 12,017 psi |
| 12 | Surface fluorinated packed in $Cr_2O_3$ | 5 | 1400°C | 2 | 13,809 psi |
| 13 | As cut | 5 | 1650°C | 1 | 13,739 psi |
| 14 | As cut packed in $Cr_2O_3$ | 5 | 1650°C | 1 | 16,678 psi |
| 15 | As cut | 5 | 1750°C | 1 | 14,045 psi |
| 16 | As cut packed in $Cr_2O_3$ | 10 | 1750°C | 1 | 14,919 psi |
| 17 | Surface fluorinated | 5 | 1750°C | 1 | 10,665 psi |
| 18 | Surface fluorinated packed in $Cr_2O_3$ | 10 | 1750°C | 1 | 17,423 psi |

Inventor
HENRY P. KIRCHNER
By Wenderoth, Lind and Ponack
Attorneys

Fig. 5

TABLE III

Chemical Strengthening of Fluorinated Spinel

Dequissit SP23 Bars

| Group No. | Treatment | Firing Temp. °C | Firing Time (hrs.) | No. of Samples | Average Flexural Strength Psi |
|---|---|---|---|---|---|
| 19 | As received | --- | --- | 5 | 15,098 |
| 20 | Fluorinated for 1 hr | --- | --- | 2 | 10,688 |
| 21 | Fluorinated for 4 hr | --- | --- | 2 | 8,009 |
| 22 | Fluorinated for 24 hr | --- | --- | 2 | 3,869 |
| 23 | Fluorinated for 1 hr | 1750 | 1 | 2 | 14,006 |
| 24 | Fluorinated for 1 hr packed in $Cr_2O_3$ | 1750 | 1 | 2 | 21,289 |
| 25 | Fluorinated for 4 hr | 1750 | 1 | 2 | 14,888 |
| 26 | Fluorinated for 4 hr packed in $Cr_2O_3$ | 1750 | 1 | 2 | 17,853 |
| 27 | Fluorinated for 24 hr | 1750 | 1 | 1 | 15,218 |
| 28 | Fluorinated for 24 hr packed in $Cr_2O_3$ | 1750 | 1 | 2 | 18,853 |

HENRY P. KIRCHNER
INVENTOR

By Wendereth,
Lind & Ponack
ATTORNEYS

FIG. 6

TABLE IV

Chemical Strengthening of Fluorinated Spinel

Linden Ceramic Oxide Spinel Bars - Isostatically Pressed

| Group No. | Treatment | Firing Temp. °C | Firing Time (hrs.) | No. of Samples | Average Flexural Strength Psi |
|---|---|---|---|---|---|
| 29 | Fluorinated for 1 hr | --- | --- | 1 | 2,857 |
| 30 | Fluorinated for 4 hr | --- | --- | 1 | 3,568 |
| 31 | Fluorinated for 24 hr | --- | --- | 1 | 769 |
| 32 | Fluorinated for 1 hr | 1750 | 1 | 2 | 4,371 |
| 33 | Fluorinated for 1 hr packed in $Cr_2O_3$ | 1750 | 1 | 2 | 19,982 |
| 34 | Fluorinated for 4 hr | 1750 | 1 | 2 | 13,925 |
| 35 | Fluorinated for 4 hr packed in $Cr_2O_3$ | 1750 | 1 | 2 | 20,230 |
| 36 | Fluorinated for 24 hr | 1750 | 1 | 2 | 5,845 |
| 37 | Fluorinated for 24 hr packed in $Cr_2O_3$ | 1750 | 1 | 2 | 5,945 |
| 38 | Control | 1750 | 1 | 5 | 14,139 |
| 39 | Packed in $Cr_2O_3$ | 1750 | 1 | 5 | 18,053 |

HENRY P. KIRCHNER
INVENTOR

BY Wenderoth,
Lind & Ponack
ATTORNEYS

United States Patent Office 3,540,915
Patented Nov. 17, 1970

3,540,915
METHOD OF STRENGTHENING ALUMINA AND SPINEL BODIES AND STRENGTHENED ALUMINA AND SPINEL BODIES PRODUCED THEREBY
Henry P. Kirchner, 700 S. Sparks St., State College, Pa. 16801
Filed Dec. 20, 1965, Ser. No. 515,073
Int. Cl. B44d *1/092, 1/52;* C03c *15/00*
U.S. Cl. 117—47                                 4 Claims

ABSTRACT OF THE DISCLOSURE

A method of increasing the bending strength, thermal shock and hardness characteristics of bodies of a ceramic material, and the strengthened bodies produced thereby. The body is treated with a fluorine containing material to dissolve out material included in the ceramic material, and then there is formed on the surface of the body at an elevated temperature a coating of a low expansion material having a coefficient of expansion which is less than that of the material of the body. The body is then cooled, and there is produced on the coated surface a layer which is under compression relative to the body.

---

The present invention relates to a method of physically strengthening polycrystalline ceramic bodies, specifically bodies of alumina and bodies of spinel, and to the alumina and spinel bodies strengthened by this method.

Alumina bodies and spinel bodies are finding more and more uses in present day technology, such as in radomes, windows for passing radiant energy in electronic tubes, and in structures used in aerospace technology. In addition, these ceramic materials have found considerable use in refractory technology.

A great drawback in the successful use of such materials has been their relatively fragile nature, both with respect to ordinary physical stresses and strains as well as so-called thermal shock. While these materials can withstand compressive stresses quite well, they are quite poor in their ability to withstand tensile stresses and bending stresses. This quite naturally limits their use in such structures as radomes and the like. This inability to withstand tensile stresses well also bears on their inability to withstand thermal shock. They withstand so-called temperature up shock, i.e. the stresses developed within the material when it is being heated up, quite well since the material tends to expand during the heating, thus becoming subjected to compressive stresses within the confines of the outside surfaces of the body. However, such materials do not withstand so-called temperature down shock, i.e. the stresses developed within the material when it is cooled. This is because when the contraction due to the cooling takes place, tensile stresses occur within the surface layers, and these tensile stresses are not well withstood by the material. As a result, flaws develop within the surface layer of the material which can in turn lead to catastrophic failure of the entire body of the material.

It is an object of the present invention to provide a method of treating alumina bodies and spinel bodies so as to improve their bending strength, thermal shock resistance properties, and hardness.

It is a further object of the invention to provide treated bodies of alumina and of spinel which have improved bending strength, thermal shock resistance and hardness characteristics.

It has been found that if there is formed at an elevated temperature on at least one surface of an alumina body or a spinel body a coating of a low expansion material, which in a preferred embodiment is a solid solution of a plurality of ceramic materials having a coefficient of expansion which is less than that of the ceramic of the body, when the body is cooled, there is produced on the surface layer thereof a layer which is under compression. Preferably the coating is formed in a way such that an additive material which mixes with the material of the body to form the compressive coating and the material of the body itself are present in proportions which vary from a high proportion of additive material to a low proportion of the additive material the deeper into the body the additive material penetrates. This results in a stress gradient in the finished material with the greatest compression of the coating being at the surface thereof, and the compressive stresses decreasing in the direction of the center of the body.

More particularly this method comprises forming at an elevated temperature on at least one surface of an aluminum oxide body or a spinel body a coating of a low expansion material, which in a preferred embodiment is a solid solution of metal oxide ceramic materials, one of which is a metal oxide of the body, and which solid solution has a lower coefficient of expansion than the coefficient of expansion of the body.

While this method has been found to increase the bending strength and thermal shock resistance characteristics of alumina and of spinel, we have now unexpectedly found that these characteristics can be still further increased to a startling degree by a simple pretreatment of the ceramic bodies, which pretreatment, contrary to what might be expected, involves modifying the condition of the material of the bodies in a manner which heretofore has been used only to improve the machinability of the bodies.

The method of the present invention comprises first fluorinating the alumina bodies or the spinel bodies. By "fluorinating" is means treating the alumina or spinel bodies with fluorine or a material containing fluorine in a form which will act on the bodies. This is done, for example by immersing them in aqueous hydrofluoric acid, subjecting them to gaseous hydrogen fluoride at a low temperature, or the like, and thereafter forming at an elevated temperature on at least one surface of the body a coating of a low expansion material, which in a preferred embodiment is a solid solution of metal oxide ceramic materials, one of which is a metallic oxide of the body, and which solid solution has a lower coefficient of expansion than the coefficient of expansion of the body. It has been found that by thus pretreating the ceramic bodies, the penetration of the solid solution layer is enhanced, and the strength characteristics as discussed above can in some instances be increased by as much as one-third.

While in the following examples the firing of the ceramic bodies has been carried out at temperatures in the vicinity of 1650° C., it is contemplated that the firing can be carried out anywhere between 1000° C. and a temperature below the melting point of the ceramic material being fired where no pressure is applied to the bodies during firing, and depending on the nature of the materials and the degree of reaction between the raw materials of the coating and the body. Where pressure is applied during firing, lower temperatures can be used.

The invention will now be described in greater detail with reference to the accompanying drawings, in which:

FIGS. 3–6 are Tables I–IV showing the strengths of various samples of the ceramic bodies.

Figure 1:
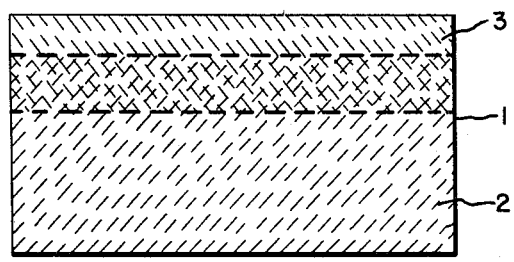
FIG. 1 is a sectional view of a ceramic body having a low expansion coating thereon in accordance with the present invention.

As seen in FIG. 1, a body 1 of ceramic material 2, for example aluminum oxide or spinel, has at least one surface, the top surface in this instance, coated with a layer 3 which is a low expansion solid solution of a plurality of ceramic materials. The coating materials and the ceramic of the body are intermixed in the zone 3a at the interfacing of the coating layer and the material of the body, there being a gradual increase in the proportion of alumina and a gradual decrease of the proportion of coating material the deeper into the body the determination of the relative amounts of these materials is made. The low expansion coating layer 3 is of a material which has a lower coefficient of expansion than the ceramic material 2 and is under compression as a result of having been formed on the material 2 at a high temperature, and the temperature of the overall structure reduced to ambient temperature. Since the relative amount of coating material in the layer 3 decreases as the distance from the coated surface increases, there is also a stress gradient, the compressive stress being greatest at the surface of the coating and decreasing in proportion to the amount of coating material the greater the distance from said coated surface. In practice it has been found that the good results are achieved when the coating material penetrates into the material 2 of the body a distance of from about .001 in. on relatively thin bodies, and up to 20% of the thickness of relatively thick bodies.

Figure 2:
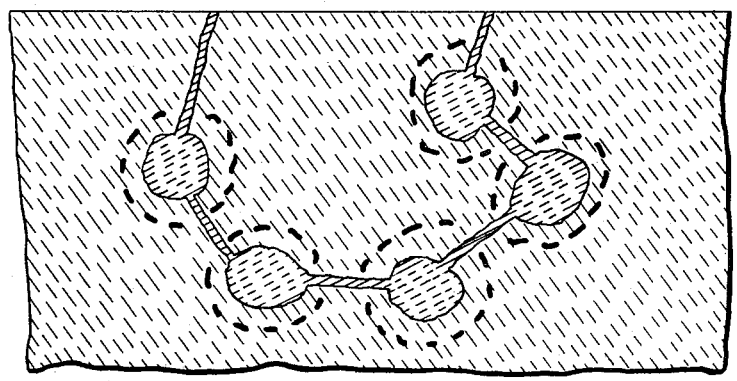
FIG. 2 is a schematic representation, or a greatly enlarged scale, of a portion of an alumina body at an intermediate stage of the treatment according to the method of the present invention.

The nature of the final material and an explanation of the manner in which the change in the material is brought about by the fluorination step preceding the actual strengthening step is schematically shown in FIG. 2. In FIG. 2, the basic material is alumina which is generally available commercially in about 96% pure form. The impurities generally consist of MgO, $SiO_2$, and CaO in small amounts, which materials are present in a separate intergranular phase or matrix 4 in the $Al_2O_3$. In order to pretreat the alumina by fluorination, it is subject to the action of fluorine, for example by soaking in hydrofluoric acid. This acts to dissolve out the intergranular impurities, the impurities deeper in the body being dissolved out the longer the fluorination continues. There is thus left a body with at least the surface portion somewhat porous and of substantially pure $Al_2O_3$. When this body is subjected to the strengthening step, for example by being packed in $Cr_2O_3$ and fired, the porous nature of the body due to the dissolving out of the intergranular impurities makes it easier for the $Cr_2O_3$ to penetrate into the $Al_2O_3$ and to go into solid solution therewith in the layer 3 of the body.

FIG. 2 shows the situation in which the $Cr_2O_3$ has penetrated the surface layer of the body, but prior to complete entering into solid solution with the surrounding $Al_2O_3$. Subsequent to the stage shown in FIG. 2, further firing completes the diffusion of the $Cr_2O_3$ into solid solution and sinters the pores closed.

It will be clear that at some point spaced from the surface of the body 1, the intergranular phase will be present and will increase until the original composition of the body is reached. It is this zone that the gradient of composition described above occurs.

It is believed that the increased strength of the materials treated according to the method of the present invention as compared with those materials which are not fluorinated is due to the ease of penetration of the strengthening material which is brought about by the pretreatment step of fluorination. It is also believed that the removal of the impurities from at least the surface layer of the alumina body is the reason for the increased hardness of the surface layer of the bodies.

Specific exemplifications of the materials of the coating 3 as well as the specific methods of forming the coating will best show the best method of carrying out the invention.

Bodies of aluminum oxide from each of a plurality of samples were prepared by cutting bars of $Al_2O_3$ having dimensions of 3" x ¼" x 9/64" from tiles of ALSIMAG 614, 96% alumina sold by American Lava Corporation.

The bars of each sample were then divided into groups. The first group was a group of unfluorinated bodies, and the second group was a group of unfluorinated bodies which was packed in $Cr_2O_3$ powder.

The third and fourth groups of bodies were soaked in hydrofluoric acid for a period of about 24 hours so as to fluorinate the surface thereof to a depth of about .010 in. The fourth group was then packed in $Cr_2O_3$ powder.

The fifth and sixth groups of bodies were soaked in fresh hydrofluoric acid for a period of about 186 hours so as to completely fluorinate and soften them. The sixth group was then packed in $Cr_2O_3$ powder.

The length of time fluorinating is carried out will determine the degree of purity of the fluorinated part of the body and the depth to which impurities are removed from the body.

All of the bodies were then refired at a temperature of about 1650° C. for a period of about 1 hour. A longer firing time will cause a greater penetration of $Cr_2O_3$, but may be accompanied by grain growth. The strength characteristics of the resulting bodies are set forth in Table I.

An X-ray diffraction analysis of the outside layer of the bars which had been fired while packed in the $Cr_2O_3$ powder indicated that the outside layer was a solid solution of $Cr_2O_3$ and $Al_2O_3$, and the color of the bar varied from green at the surface to pink and to white, thereby indicating a composition gradient from substantially pure $Cr_2O_3$ to the substantially pure $Al_2O_3$ of the bar body.

It will be seen from the results set forth in Table I that the surface fluorinated bars were from about 3000 to 10,000 p.s.i. stronger than the unfluorinated bars which were packed in $Cr_2O_3$.

In addition, it was found that the fluorinated bodies which were packed in $Cr_2O_3$ and refired were harder than the bodies which were not fluorinated. It is believed that this is due to the fact that impurities are removed from the fluorinated bodies by the fluorination step.

A sample similar in size and composition to samples 1–10 of Table I was surface fluorinated by the above method, and was refired at 1750° C. for one hour. The surface hardness was measured with a Tukon hardness tester with a Knoop diamond indenter using a 1000 gm. load. Surface indentations measured in the long direction of the diamond and having a dimension as low as .040 mm. were characteristic of the solid solutions formed in the pink fluorinated solid solution surface layer of the sample, while indentations larger than .100 mm. are characteristic of untreated 96% pure $Al_2O_3$ material.

It will be understood that it is also possible to fluorinate with other fluorinating materials, such as mixtures of hydrofluoric acid and sulphuric acid, and ammonium fluoride. In addition, while the materials used in the specific examples had only about 5% impurities, the method will be effective in strengthening ceramics of commercial purity which can contain up to 15% impurities.

Fluorination of spinel has also proved to increase the strength of this material. Ideally spinel is a compound of MgO and $Al_2O_3$ in a mole ratio of 1:1, being 40 parts by weight of MgO to 102 parts by weight of $Al_2O_3$.

Samples in the shape of hollow cylinders of Degussit Sp23, a spinel having the above composition were prepared, the cylinders having an outside diameter of 237 mm. and an inside diameter of 117 mm. Certain of the samples were packed in $Cr_2O_3$ powder and fired, while others were fluorinated by soaking in hydrofluoric acid for 30 min. and then refired. The strengths of the various samples were as shown in Table II.

It can be seen from the results set forth in Tables II–IV that the strength of the fluorinated samples of spinel which were chemically strengthened were about 15% stronger than unstrengthened fluorinated samples when fired at 1400° C. for two hours, and were up to 25% stronger than samples which were simply chemically strengthened and fired at 1750° C. for one hour. In all cases the samples which were fluorinated and then chemically strengthened were significantly stronger than unfluorinated chemically strengthened samples.

An X-ray diffraction analysis of the outside layer of the samples which has been fired while packed in the $Cr_2O_3$ powder indicated that a solid solution of $MgO \cdot Cr_2O_3$ in $MgO \cdot Al_2O_3$ was present in the outside layer.

The Linden Ceramic Oxide spinel bars of Table IV were somewhat more porous than the Degussit bars of Table III and appear to be affected by fluorination somewhat more than the bars of Degussit spinel.

What is claimed is:

1. A method of increasing the bending strength, thermal shock and hardness characteristics of a ceramic material taken from the group consisting of alumina and spinel, said ceramic material having included therein up to about 15% of at least one material which is soluble in a fluorine compound, comprising the steps of treating the body with a fluorine compound which is able to dissolve said included material, packing at least one surface of the body in $Cr_2O_3$ powder, heating the thus packed body at a temperature of from about 1400 to about 1750° C. for forming a coating of a low expansion material which consists essentially of a solid solution of $Cr_2O_3$ and the material of said body, the coating having a coefficient of expansion which is less than that of the material of the body, and then cooling the body, whereby there is produced on the coated surface of the body a layer which is under compression relative to the body.

2. A method as claimed in claim 1 in which said body is of alumina and said solid solution is $Cr_2O_3$.

3. A method as claimed in claim 1 in which said body is spinel, and said solid solution is $MgO \cdot Cr_2O_3$ in $MgO \cdot Al_2O_3$.

4. A body of ceramic material taken from the group consisting of alumina and spinel and having included therein up to about 15% of at least one material which is soluble in a fluorine compound, said body having increased bending strength, thermal shock and hardness characteristics, said body being made by treating the body with a fluorine compound which is able to dissolve said included material, packing at least one surface of the body in $Cr_2O_3$ powder, heating the thus packed body at a temperature of from about 1400 to about 1750° C. for forming a coating of a low expansion material which consists essentially of a solid solution of $Cr_2O_3$ and the material of said body, the coating having a coefficient of expansion which is less than that of the material of the body, and then cooling the body, whereby there is produced on the coated surface of the body a layer which is under compression relative to the body.

References Cited

UNITED STATES PATENTS

| | | | |
|---|---|---|---|
| 2,157,100 | 5/1939 | Rowland | 117—125 XR |
| 2,337,691 | 12/1948 | Stettinius et al. | 117—125 XR |
| 2,629,161 | 2/1953 | Kistler | 117—125 XR |
| 2,934,667 | 4/1960 | Pincas | 117—125 XR |
| 3,352,007 | 11/1967 | Charles | 117—113 XR |
| 1,482,793 | 2/1924 | Hartmann | 156—2 XR |
| 2,308,473 | 1/1943 | Wadman et al. | 264—62 XR |
| 2,448,511 | 9/1948 | Barnes et al. | 117—169 XR |
| 2,872,312 | 2/1959 | Eisenberg | 117—54 XR |
| 3,034,921 | 5/1962 | Thompson | 117—54 |
| 3,049,447 | 8/1962 | Knapp | 117—169 |
| 3,069,292 | 12/1962 | Alexander et al. | 117—169 XR |
| 3,296,017 | 1/1967 | Rubin | 117—169 XR |

DAVID KLEIN, Primary Examiner

U.S. Cl. X.R.

117—169, 125